United States Patent
Theyab (10) Patent No.: US 11,163,084 B1
(45) Date of Patent: Nov. 2, 2021

(54) MACHINE LEARNING-BASED DIFFERENCING TOOL FOR HYDROCARBON WELL LOGS

(71) Applicant: Saudi Arabian Oil Company, Dhahran (SA)

(72) Inventor: Abdullah A. Theyab, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/993,463

(22) Filed: Aug. 14, 2020

(51) Int. Cl.
| G01V 1/50 | (2006.01) |
| G01V 1/28 | (2006.01) |
| G06N 20/00 | (2019.01) |
| G06N 3/08 | (2006.01) |
| G06K 9/62 | (2006.01) |

(52) U.S. Cl.
CPC .......... G01V 1/50 (2013.01); G01V 1/282 (2013.01); G06K 9/6289 (2013.01); G06N 3/08 (2013.01); G06N 20/00 (2019.01)

(58) Field of Classification Search
USPC .......................................................... 702/6
See application file for complete search history.

(56) References Cited

U.S. PATENT DOCUMENTS

| 7,963,327 B1 | 6/2011 | Saleri et al. |
| 8,457,898 B2 | 6/2013 | Hartmann et al. |
| 8,793,112 B2 | 7/2014 | Levitan |
| 9,734,223 B2 | 8/2017 | Bourbonnais et al. |
| 2019/0368316 A1* | 12/2019 | Bize-Forest ........... G06N 20/00 |
| 2020/0225177 A1* | 7/2020 | Sungkorn ............. G01V 11/002 |
| 2020/0301036 A1* | 9/2020 | Ramfjord ............... G01V 99/00 |
| 2021/0264262 A1* | 8/2021 | Colombo ................. G06N 3/08 |

OTHER PUBLICATIONS

Github.io [online], "CS231n Convolutional Neural Networks for Visual Recognition: Convolutional Neural Networks (CNNs / ConvNets)," available on or before Feb. 5, 2015 via Internet Archive: Wayback Machine URL<https://web.archive.org/web/20150205070319/https://cs231n.github.io/convolutional-networks/>, retrieved on Nov. 2, 2020, retrieved from URL<https://cs231n.github.io/convolutional-networks/>, 23 pages.

Lawrence et al., "Face Recognition: A Convolutional Neural Network Approach," IEEE Transactions on Neural Networks, Jan. 1997, 8(1):98-113.

* cited by examiner

*Primary Examiner* — Paul D Lee
(74) *Attorney, Agent, or Firm* — Fish & Richardson P.C.

(57) ABSTRACT

Methods for machine learning-based differencing for hydrocarbon well logs are disclosed. A computer system generates an input layer of a machine learning module. The input layer includes a graphical representation of datasets obtained from one or more hydrocarbon wells. The computer system generates an encoding layer of the machine learning module from the graphical representation. The encoding layer includes a two-dimensional array based on the multiple datasets and a merged dataset of the one or more hydrocarbon wells. The computer system determines that a difference between a first hydrocarbon well log of the multiple datasets and a second hydrocarbon well log of the merged dataset warrants an action. The determining is performed using a convolutional layer. Responsive to determining that the difference warrants an action, the computer system performs the action on the first hydrocarbon well log and the second hydrocarbon well log to modify the merged dataset.

20 Claims, 5 Drawing Sheets

Generate, by a computer system, an input layer of a machine learning module of the computer system, the input layer including a graphical representation of multiple datasets obtained from one or more hydrocarbon wells, the graphical representation defining multiple bins
404

Generate, by the computer system, an encoding layer of the machine learning module from the graphical representation, the encoding layer including a two-dimensional (2D) array based on the multiple datasets and a merged dataset of the one or more hydrocarbon wells
408

Determine, by the computer system, that a difference between a first hydrocarbon well log of the multiple datasets and a second hydrocarbon well log of the merged dataset warrants an action, wherein the determining is performed using a convolutional layer of the machine learning module
412

Responsive to determining that the difference warrants an action, perform, by the computer system, the action on the first hydrocarbon well log and the second hydrocarbon well log to modify the merged dataset
416

Produce, by the computer system, the merged dataset for generating a subsurface model of the one or more hydrocarbon wells
420

MACHINE LEARNING-BASED DIFFERENCING TOOL FOR HYDROCARBON WELL LOGS

TECHNICAL FIELD

This description relates to machine learning-based differencing for hydrocarbon well logs.

BACKGROUND

Data management of hydrocarbon well logs is used for exploration of hydrocarbon fields and reservoirs. However, logs obtained from hydrocarbon wells can be challenging to process and analyze because the logs can be splintered and stored separately. As a result, databases can have different levels of completeness. Sonic wireline logs are one example of logs that can be collected in separate logging runs for different reservoir sections, further complicating analysis and processing.

SUMMARY

Methods, systems, and apparatuses for machine learning-based differencing for hydrocarbon well logs are disclosed. A computer system generates an input layer of a machine learning module of the computer system. The input layer includes a graphical representation of multiple datasets obtained from one or more hydrocarbon wells. The graphical representation defines multiple bins. The computer system generates an encoding layer of the machine learning module from the graphical representation. The encoding layer includes a two-dimensional (2D) array based on the multiple datasets and a merged dataset of the one or more hydrocarbon wells. The computer system determines that a difference between a first hydrocarbon well log of the multiple datasets and a second hydrocarbon well log of the merged dataset warrants an action. The determining is performed using a convolutional layer of the machine learning module. Responsive to determining that the difference warrants an action, the computer system performs the action on the first hydrocarbon well log and the second hydrocarbon well log to modify the merged dataset. The computer system produces the merged dataset for generating a subsurface model of the one or more hydrocarbon wells.

In some implementations, the multiple datasets and the merged dataset are wireline datasets. The 2D array defines a horizontal number of bins and a vertical number of bins of the multiple bins.

In some implementations, the performing of the action includes splicing, by the computer system, the first hydrocarbon well log and the second hydrocarbon well log into the merged dataset based on the difference. In some implementations, the performing of the action includes replacing, by the computer system, the second hydrocarbon well log with the first hydrocarbon well log based on the difference.

In some implementations, the generating of the encoding layer includes assigning a particular value to each bin of the multiple bins responsive to at least one of the first hydrocarbon well log or the second hydrocarbon well log intersecting the bin.

In some implementations, the computer system filters the 2D array using the convolutional layer of the machine learning module.

In some implementations, the computer system trains the machine learning module to determine differences between stored hydrocarbon well logs. The computer system determines filter coefficients of the convolutional layer of the machine learning module based on the training.

In some implementations, the computer system processes the 2D array using a modified rectified linear unit (RelU) layer of the machine learning module.

DETAILED DESCRIPTION

The implementations disclosed provide methods, apparatus, and systems for machine learning-based differencing for hydrocarbon well logs. The methods for machine learning-based differencing highlight distinctions between logs of hydrocarbon wells that are stored in different databases but correspond to the same hydrocarbon well. A machine learning method implemented in a convolutional neural network (CNN) is used to differentiate between the differences among the hydrocarbon well logs that require further processing and action and the differences among the hydrocarbon well logs that do not need further processing and action. In some implementations, a computer system generates an input layer of a machine learning module of the computer system. The input layer includes a graphical representation of multiple datasets obtained from one or more hydrocarbon wells. The graphical representation defines multiple bins. The computer system generates an encoding layer of the machine learning module from the graphical representation. The encoding layer includes a two-dimensional (2D) array based on the multiple datasets and a merged dataset of the one or more hydrocarbon wells. The computer system determines that a difference between a first hydrocarbon well log of the multiple datasets and a second hydrocarbon well log of the merged dataset warrants an action. The determining is performed using a convolutional layer of the machine learning module. Responsive to determining that the difference warrants an action, the computer system performs the action on the first hydrocarbon well log and the second hydrocarbon well log to modify the merged dataset. The computer system produces the merged dataset for generating a subsurface model of the one or more hydrocarbon wells.

Among other benefits and advantages, the methods provide reduced processing time for hydrocarbon reservoir exploration, especially for when synchronizing and analyzing hydrocarbon well logs that are stored among different databases. For example, during hydrocarbon prospect generation, the positioning and the operations of exploration wells and booking of hydrocarbon resources need data collected in a complete database, which is provided by the implementations disclosed herein.

Figure 1:
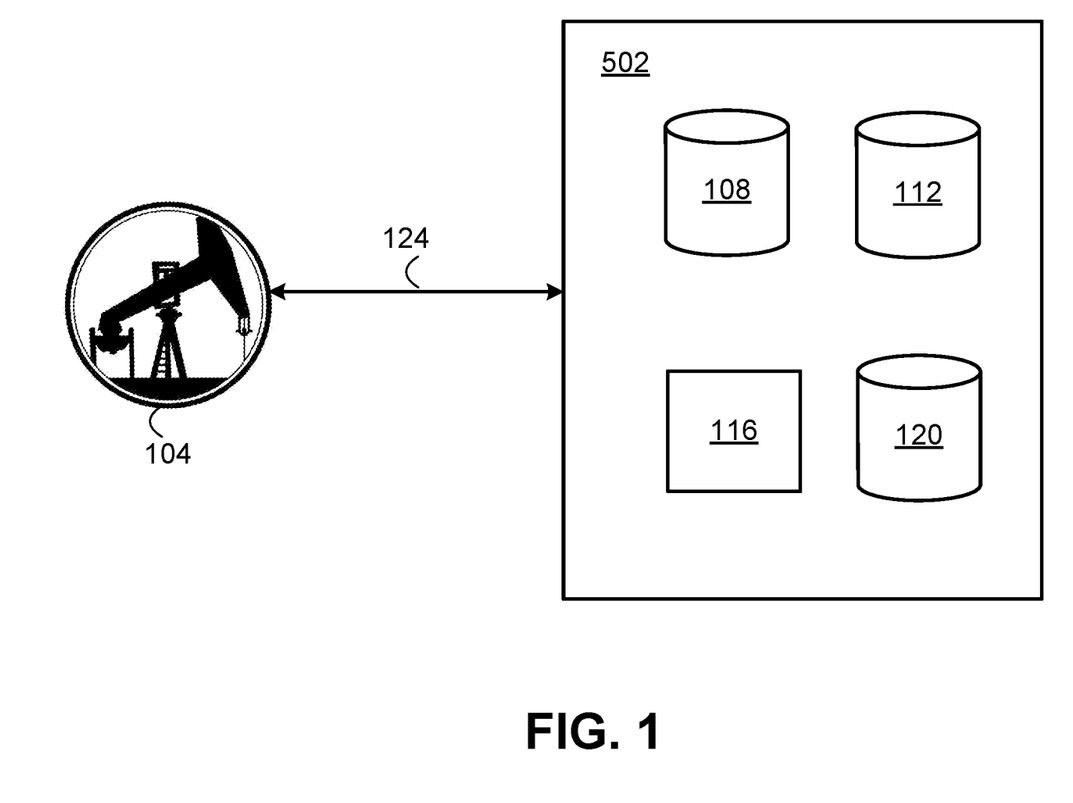
FIG. 1 illustrates an architecture for machine learning-based differencing for hydrocarbon well logs, in accordance with one or more implementations.

FIG. 1 illustrates an architecture for machine learning-based differencing for hydrocarbon well logs, in accordance with one or more implementations. The architecture includes multiple hydrocarbon wells 104 and a computer system 502. The computer system 502 is described and illustrated in more detail with reference to FIG. 5. The computer system 502 includes multiple datasets 108 obtained from the multiple hydrocarbon wells 104 and a 2D array 112 generated by the computer system 502. The computer system further includes a machine learning module 116 and a merged dataset 120 that is generated by the computer system 502. In some implementations, the machine learning module 116 is a CNN, e.g., the CNN 300, illustrated and described in more detail with reference to FIG. 3. Each entity within the computer system 502 illustrated in FIG. 1 can be implemented in hardware, software, firmware, or a combination thereof. For example, each entity can be an analog or digital circuit, a microprocessor, an application-specific integrated circuit, some other implementation, or a combination thereof as described and illustrated in more detail with reference to FIG. 5.

The computer system 502 is used for data management (of data 124) for exploration of hydrocarbon fields and reservoirs. Hydrocarbon exploration (or oil and gas exploration) refers to a search for deposits of hydrocarbons, particularly petroleum and natural gas, in the Earth using petroleum geology. In some implementations, the data 124 includes logs collected from water supply wells, water injection wells, observation wells, or CO2 sequestration wells. In some implementations, the multiple datasets 108 and the merged dataset 120 are wireline datasets. In particular, the computer system 502 is used to implement an assisting tool for synchronizing and analyzing hydrocarbon well logs (the datasets 108) that are stored among different databases to form the complete wireline dataset 120. The hydrocarbon well logs obtain a continuous record of a formation's rock properties. For example, wireline logging can be used to acquire and analyze geophysical data performed as a function of well bore depth. Analysis can be used to infer further properties, such as hydrocarbon saturation and formation pressure, and to make further drilling and production decisions. In some implementations, a subsurface description workflow begins with gathering the available data (datasets 108) on a network or local hard drives of the computer system 502. The datasets 108 are then used as input for integration workflows that generate subsurface models used for making operational decisions in hydrocarbon exploration.

In some implementations, wireline logs (e.g., data 124) of the multiple hydrocarbon wells 104 are used. Wireline logs of the multiple hydrocarbon wells 104 can be challenging to process and analyze because the logs (datasets 108) are stored in different databases. Different business entities of a hydrocarbon exploration project often maintain their own copies of the logs as needed. As a result, databases can have different levels of completeness. For example, a sonic wireline log can be collected in two logging runs: one for the shallow section and a second run for the deeper section. Two business entities can be interested in different sections. Thus, each entity can copy the relevant part into its own database. A third entity can collect the data 124 for both runs and merge them together into a different database (e.g., merge dataset 120). Similarly, data 124 obtained from different logging tools and different hydrocarbon wells can be splintered and stored separately. To analyze a drilling proposal, the relevant data 124 needs to be collected and processed. Collecting the data 124 can involve checking different databases and comparing logs. Such a process can be time consuming when the databases and individual logs (datasets 108) are loaded and checked one-by-one.

A computer can be used to analyze the individual logs (datasets 108) and determine whether they are identical or not. For example, a deterministic algorithm can be used when the data 124, spread among multiple databases, is numerically identical. However, the individual logs (datasets 108) may not always be numerically identical. For example, individual logs that are numerically different can be actually the same physically but can be sampled at a different depths. The logs can begin and end at different depths or the logs can have different log values due to processing applied to the logs. In such cases, using traditional methods a human interpreter can be needed to analyze the logs one-by-one. The implementations disclosed herein obviate such traditional methods.

In the implementations disclosed herein, machine learning is used to implement a solution to the computer vision problem to analyze hydrocarbon well logs from different datasets 108, 120. The wireline hydrocarbon well logs are obtained by lowering a logging tool or a string of one or more instruments on the end of a wireline into the multiple hydrocarbon wells 104 (or boreholes) and recording petrophysical properties using sensors. For example, logging tools measure the natural gamma ray, electrical, acoustic, stimulated radioactive responses, electromagnetic, nuclear magnetic resonance, pressure and other properties of the rocks and their contained fluids.

The data 124 is recorded either at surface (real-time mode), or in the hole (memory mode) to an electronic data format (datasets 108). An electronic presentation (the 2D array 112) can be displayed along with an electronic copy of the raw data 108. The logging operations can either be performed during the drilling process (logging while drilling), to provide real-time information about the formations being penetrated by the borehole, or once a well 104 has reached "Total Depth" and the entire depth of the borehole can be logged. The computer system 502 generates a plot (graphical representation) of the logs (in datasets 108, 120) being compared and the difference are analyzed. An example graphical representation is illustrated and described in more detail with reference to FIG. 2. The computer system 502 determines whether a difference in the hydrocarbon well logs from different datasets 108, 120 requires an action or not based on recorded investigations. In some implementations, the computer system 502 generates a graphical user interface (GUI) highlighting the differences in the hydrocarbon well logs from different datasets 108, 120 that require an action.

Figure 2:
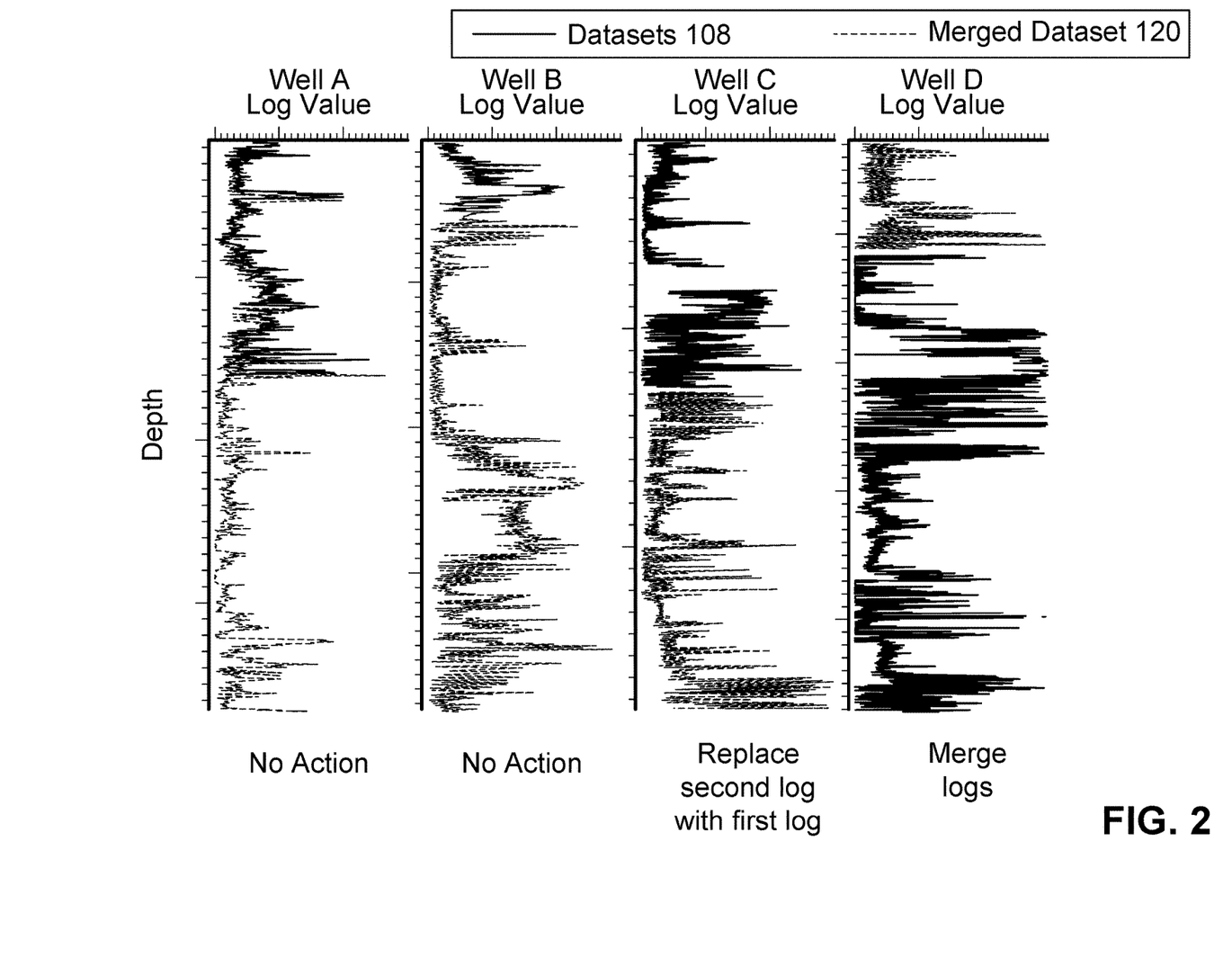
FIG. 2 illustrates examples of hydrocarbon well logs, in accordance with one or more implementations.

FIG. 2 illustrates examples of hydrocarbon well logs, in accordance with one or more implementations. In particular, FIG. 2 shows different scenarios in which a goal is to collect different hydrocarbon well logs from the datasets 108 into the merged dataset 120 in a target database. The datasets 108 and the merged dataset 120 are illustrated and described in more detail with reference to FIG. 1. The data that is stored in the target database (merged dataset 120) is compared to one of the databases (datasets 108). For example, the hydrocarbon well logs for wells A and B are already captured in the target database (merged dataset 120); hence no action is needed. For wells C and D, however, an action is needed to include their data into the target database (merged dataset 120). FIG. 2 thus illustrates examples of different hydrocarbon well logs being merged from a source database (datasets 108) to a target database (merged dataset 120) and the actions taken to complete the target database.

In some implementations, performing of an action includes splicing, by a computer system 502, a first hydrocarbon well log of the datasets 108 and a second hydrocarbon well log of the merged dataset 120 into the merged dataset 120 based on differences between logs in the different databases. The computer system 502 is illustrated and described in more detail with reference to FIG. 5. In some implementations, performing of an action includes replacing, by the computer system 502, the second hydrocarbon well log with the first hydrocarbon well log based on the difference. For example, an action can include replacing a log in the target database (merged dataset 120) with a log being investigated. An action can include splicing the log in the target database (merged dataset 120) with a log being investigated. The determining of actions based on differences in logs is illustrated and described in more detail with reference to FIG. 3.

Figure 3:
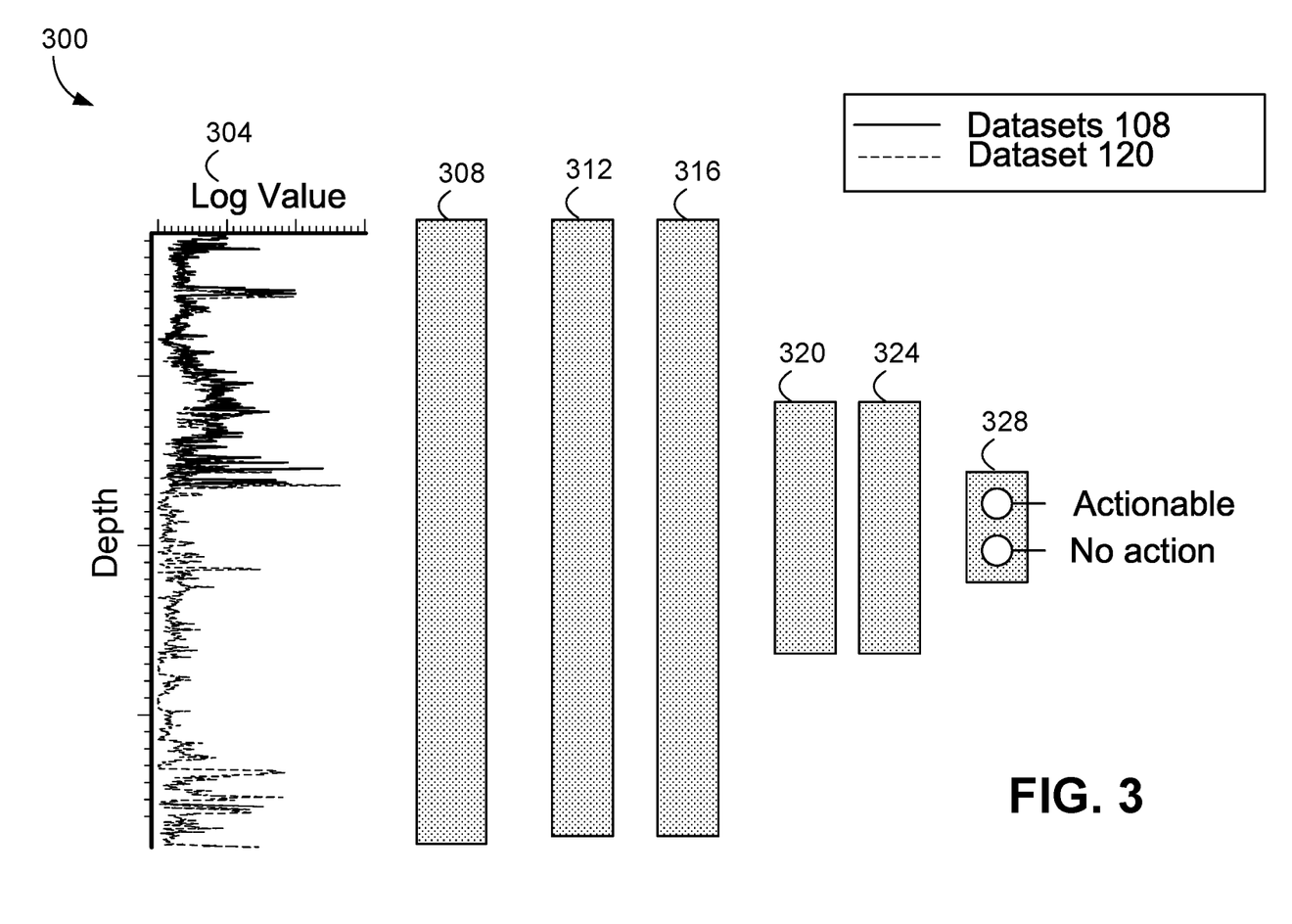
FIG. 3 illustrates a convolutional neural network, in accordance with one or more implementations.

FIG. 3 illustrates a convolutional neural network (CNN) 300, in accordance with one or more implementations. The CNN 300 is used to determine whether there is a difference between the logs that needs an action to be performed on the datasets 108, 120. In some implementations, the CNN 300 is an implementation of the machine learning module 116. The CNN 300 includes an input layer 304 and an output layer (softmax layer 328), as well as multiple hidden layers 308-324. The hidden layers of the CNN 300 can include a series of convolutional layers (e.g., convolutional layer 312) that convolve with a multiplication or other dot product. An activation function can be used (RelU layer 316), and can be subsequently followed by additional convolutions such as pooling layers, fully connected layers and normalization layers.

The computer system 502 generates the input layer 304 of the machine learning module 116 of the computer system 502. The computer system 502 is illustrated and described in more detail with reference to FIG. 5. The machine learning module 116 is illustrated and described in more detail with reference to FIG. 1. The input layer 304 includes a graphical representation of the multiple datasets 108 obtained from the one or more hydrocarbon wells 104. The multiple datasets 108 and the one or more hydrocarbon wells 104 are illustrated and described in more detail with reference to FIG. 1. The graphical representation defines multiple bins. In particular, the machine learning module 116 (e.g., CNN 300) makes a decision on the hydrocarbon log differences between the datasets 108 and the merged dataset 120. The merged dataset 120 is illustrated and described in more detail with reference to FIG. 1.

In some implementations, the computer system 502 generates an encoding layer 308 of the machine learning module 116 from the graphical representation. The encoding layer 308 includes the 2D array 112 based on the multiple datasets 108 and the merged dataset 120 of the one or more hydrocarbon wells 104. The 2D array 112 is illustrated and described in more detail with reference to FIG. 1. The computer system 502 (using the machine learning module 116) performs encoding, where the graphical representation of the multiple datasets 108 obtained from the hydrocarbon wells 104 is digitized into the 2D array 112 that spans the area of the graphical representation of the multiple datasets 108 with a number of bins in the X and Y directions. In some implementations, the 2D array 112 defines a horizontal number of bins and a vertical number of bins of the multiple bins. For example, the graphical representation of the multiple datasets 108 can be divided into 30 bins horizontally and 100 bin vertically.

In some implementations, the generating of the encoding layer 308 includes assigning a particular value to each bin of the multiple bins responsive to at least one of the first hydrocarbon well log or the second hydrocarbon well log intersecting the bin. For each bin of the graphical representation, the computer system 502 (using the machine learning module 116) determines whether any logs (from the datasets 108, 120) intersect the bin. If no logs intersect the bin, the bin is assigned the value 0. If a log from the target database (merged dataset 120) is the only log that intersects the bin, the bin is assigned the value 2. If only a log from the source database (datasets 108) intersects the bin, the bin is assigned the value −1. If logs from both the source and the target databases (merged dataset 120) intersect the bin, the bin is assigned the value 1. The encoding process results in the 2D array 112 that is used as input to the 2D convolutional layer 312 of the machine learning module 116.

In some implementations, the computer system 502 filters the 2D array 112 using the convolutional layer 312 of the machine learning module 116. The computer system 502 trains the machine learning module 116 to determine differences between stored hydrocarbon well logs. The computer system 502 determines filter coefficients of the convolutional layer 312 of the machine learning module 116 based on the training. For example, the convolutional layer 312 applies a single 3-by-3 filter to its input (the encoding layer 308). The filter coefficients are determined during the network training. In some implementations, the computer system 502 processes the 2D array 112 using a modified rectified linear unit (RelU) layer 316 of the machine learning module 116. For example, the output of the 3-by-3 filter is passed to the modified RelU layer 316 that acts as an activation function as shown in equations (1) and (2):

$$RelU(x) = 0.1 \times x, x < 0 \quad (1)$$

$$RelU(x) = x, x \geq 0 \quad (2)$$

The computer system 502 determines that a difference between a first hydrocarbon well log of the multiple datasets 108 and a second hydrocarbon well log of the merged dataset 120 warrants an action. The determining is performed using the convolutional layer 312 of the machine learning module 116. In some implementations, the outcome of the RelU layer 316 is transmitted to a fully connected network (FCN) 320 that transmits its output to another RelU layer 324, which transmits its output to a softmax layer 328 that calculates probabilities of the two possible outcomes: an actionable difference or no action is needed. The FCN 320 is a type of artificial neural network where the architecture is such that all the nodes, or neurons, in one layer are connected to the neurons in the next layer. The softmax layer 328 performs a function that converts a vector of K real values into a vector of K real values that sum to 1. The input values can be positive, negative, zero, or greater than one, but the softmax layer 328 transforms them into values between 0 and 1, so that they can be interpreted as probabilities. The CNN 300 in FIG. 3 is thus used to detect whether there is a difference between the hydrocarbon well logs (from the datasets 108, 120) that require an action.

Responsive to determining that the difference warrants an action, the computer system 502 performs the action on the first hydrocarbon well log and the second hydrocarbon well log to modify the merged dataset 120. The computer system 502 produces the merged dataset 120 for generating a subsurface model of the one or more hydrocarbon wells 104. The subsurface model incorporates geologic characteristics of a reservoir. The subsurface model can be used to quantify characteristics within a subsurface volume. For example, the characteristics can include the structural shape and thicknesses of the formations within the subsurface volume being modeled, their lithologies, and the porosity and permeability distributions.

In experiments, the CNN 300 was coded using a C++ library and trained using historical datasets that were labeled based on whether the differences between stored hydrocarbon logs was actionable or not. The CNN 300 was tested on hydrocarbon logs (from the datasets 108, 120) that were not in the training set and the CNN 300 identified actionable differences between the hydrocarbon well logs with 85% accuracy. In other experiments, accuracy was increased to over 90% by additional training and a larger training dataset. Further, nearly all of the classification errors encountered in the experiment were found to be false positives (non-actionable differences indicated to be actionable), which are tolerable unlike false negatives (actionable differences indicated to be non-actionable). Such classification errors are associated with certain types of logs that have a high variance between raw and processed logs (as a result of severe noise, adverse borehole conditions, and the nature of the sensors). Moreover, some logs used in the experiments were older (e.g., from the 1960's). Such differences are classified as non-actionable even though the logs are very different. For example, classifying such differences as actionable would not alter anything in the target database. In some implementations, those specific logs were detected (from a blacklist) and excluded before the difference process.

Figure 4:
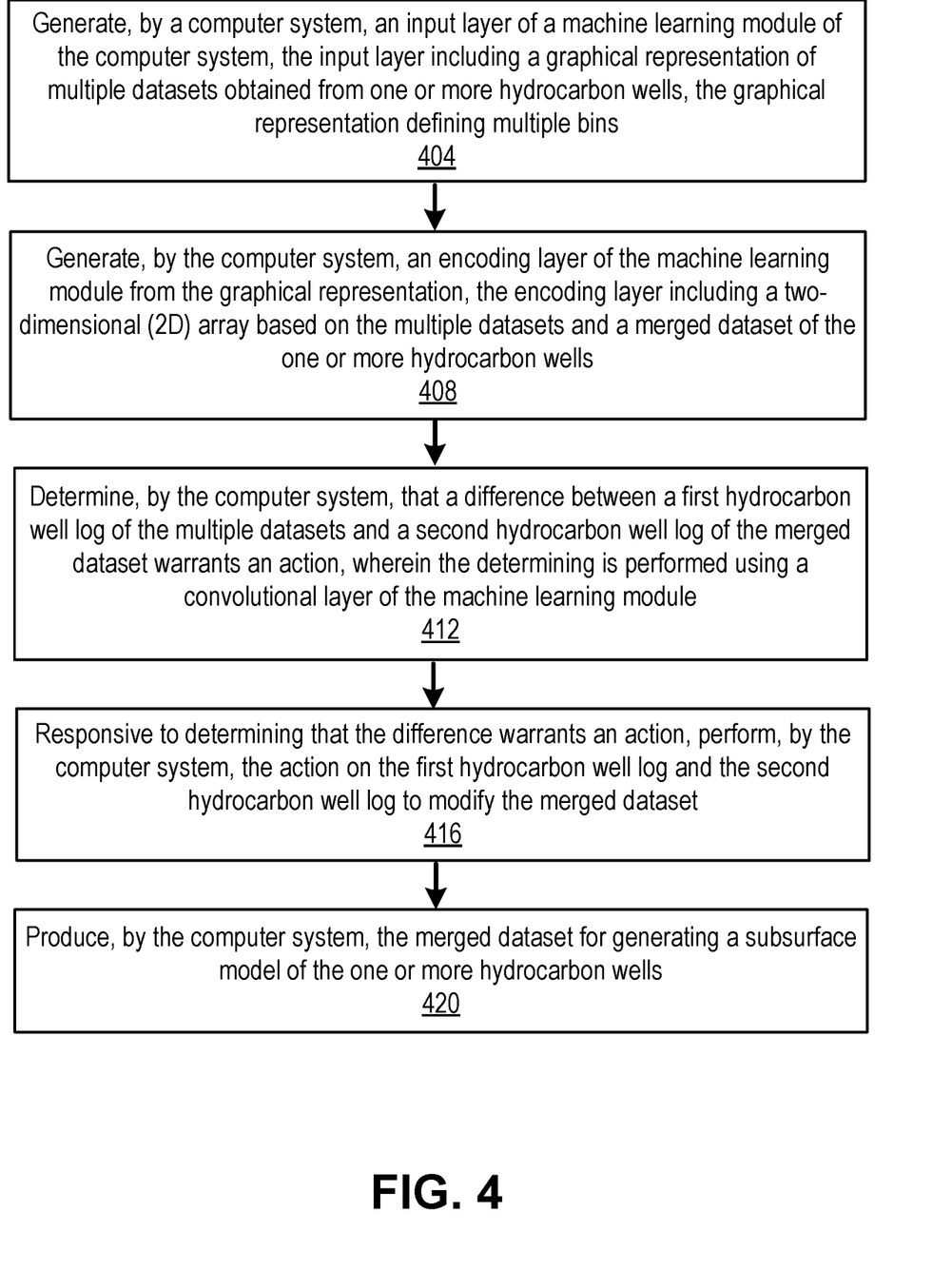
FIG. 4 illustrates a process for machine learning-based differencing for hydrocarbon well logs, in accordance with one or more implementations.

FIG. 4 illustrates a process for machine learning-based differencing for hydrocarbon well logs, in accordance with one or more implementations. In some implementations, the process is performed by the computer system 502, illustrated and described in more detail with reference to FIG. 5.

In step 404, one or more processors 505 of the computer system 502 generate an input layer 304 of a machine learning module 116 of the computer system 502. The processors 505 are illustrated and described in greater detail with reference to FIG. 5. The input layer 304 is illustrated and described in greater detail with reference to FIG. 3. The machine learning module 116 is illustrated and described in greater detail with reference to FIG. 1. The input layer 304 includes a graphical representation of multiple datasets 108 obtained from one or more hydrocarbon wells 104. The multiple datasets 108 and the hydrocarbon wells 104 are illustrated and described in greater detail with reference to FIG. 1. The graphical representation defines multiple bins of the data 124. The data 124 is illustrated and described in greater detail with reference to FIG. 1.

In step 408, the computer system 502 generates an encoding layer 308 of the machine learning module 116 from the graphical representation. The encoding layer 308 is illustrated and described in greater detail with reference to FIG. 3. The encoding layer 308 includes the 2D array 112 based on the multiple datasets 108 and the merged dataset 120 of the one or more hydrocarbon wells 104. The 2D array 112 and the merged dataset 120 are illustrated and described in greater detail with reference to FIG. 1.

In step 412, the computer system 502 determines that a difference between a first hydrocarbon well log of the multiple datasets 108 and a second hydrocarbon well log of the merged dataset 120 warrants an action. The determining is performed using a convolutional layer 312 of the machine learning module 116. The convolutional layer 312 is illustrated and described in greater detail with reference to FIG. 3.

In step 416, responsive to determining that the difference warrants an action, the computer system 502 performs the action on the first hydrocarbon well log and the second hydrocarbon well log to modify the merged dataset 120. In some implementations, performing of an action includes splicing, by the computer system 502, a first hydrocarbon well log of the datasets 108 and a second hydrocarbon well log of the merged dataset 120 into the merged dataset 120 based on the difference. In some implementations, performing of an action includes replacing, by the computer system 502, the second hydrocarbon well log with the first hydrocarbon well log based on the difference.

In step 420, the computer system 502 produces the merged dataset 120 for generating a subsurface model of the one or more hydrocarbon wells 104. The subsurface model incorporates geologic characteristics of a reservoir. The subsurface model can be used to quantify characteristics within a subsurface volume. For example, the characteristics can include the structural shape and thicknesses of the formations within the subsurface volume being modeled, their lithologies, and the porosity and permeability distributions.

Figure 5:
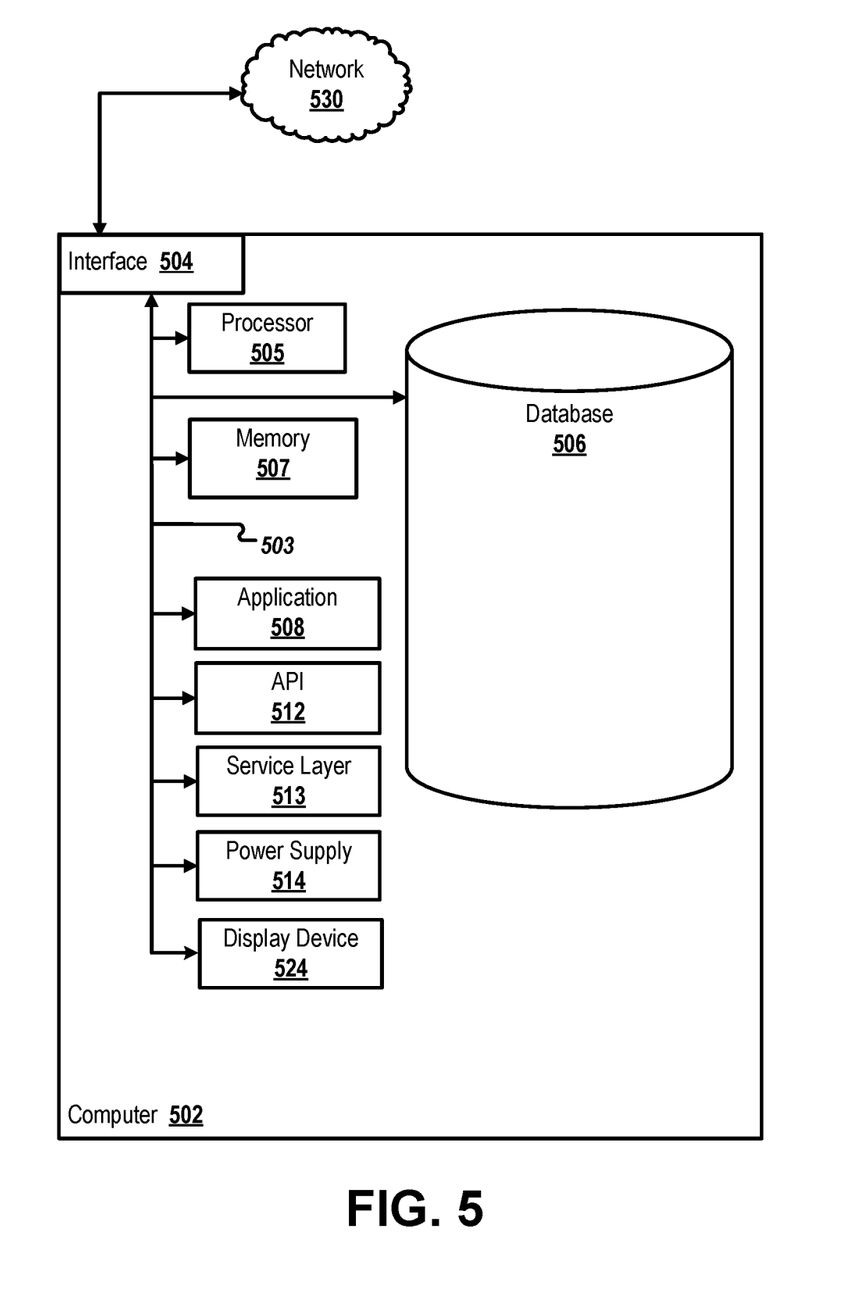
FIG. 5 illustrates an example machine, in accordance with one or more implementations.

FIG. 5 illustrates an example machine 502, in accordance with one or more implementations. In the example implementation, the computer system 502 is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In particular, the example computer system 502 is used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop or notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output display devices 524 that can convey information associated with the operation of the computer 502. The information can include digital data, visual data, audio information, or a combination of information. The information can be presented in a graphical user interface (GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a computer system, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 304 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms client, user, and other appropriate terminology can be used interchangeably, as appropriate, without departing from the scope of the present disclosure. Moreover, the present disclosure contemplates that many users can use one computer 502 and one user can use multiple computers 502.

What is claimed is:

1. A method comprising:
generating, by a computer system, an input layer of a machine learning module of the computer system, the input layer comprising a graphical representation of a plurality of datasets obtained from one or more hydrocarbon wells, the graphical representation defining a plurality of bins;
generating, by the computer system, an encoding layer of the machine learning module from the graphical representation, the encoding layer comprising a two-dimensional (2D) array based on the plurality of datasets and a merged dataset of the one or more hydrocarbon wells;
determining, by the computer system, that a difference between a first hydrocarbon well log of the plurality of datasets and a second hydrocarbon well log of the merged dataset warrants an action, wherein the determining is performed using a convolutional layer of the machine learning module;
responsive to determining that the difference warrants an action, performing, by the computer system, the action on the first hydrocarbon well log and the second hydrocarbon well log to modify the merged dataset; and
producing, by the computer system, the merged dataset for generating a subsurface model of the one or more hydrocarbon wells.

2. The method of claim 1, wherein the plurality of datasets and the merged dataset are wireline datasets, and wherein the 2D array defines a horizontal number of bins and a vertical number of bins of the plurality of bins.

3. The method of claim 1, wherein the performing of the action comprises at least one of:
splicing, by the computer system, the first hydrocarbon well log and the second hydrocarbon well log into the merged dataset based on the difference; or
replacing, by the computer system, the second hydrocarbon well log with the first hydrocarbon well log based on the difference.

4. The method of claim 1, wherein the generating of the encoding layer comprises assigning a particular value to each bin of the plurality of bins responsive to at least one of the first hydrocarbon well log or the second hydrocarbon well log intersecting the bin.

5. The method of claim 1, further comprising filtering, by the computer system, the 2D array using the convolutional layer of the machine learning module.

6. The method of claim 1, further comprising:
training, using the computer system, the machine learning module to determine differences between stored hydrocarbon well logs; and
determining, by the computer system, filter coefficients of the convolutional layer of the machine learning module based on the training.

7. The method of claim 1, further comprising processing, by the computer system, the 2D array using a modified rectified linear unit (RelU) layer of the machine learning module.

8. A non-transitory computer-readable storage medium storing instructions executable by one or more computer processors of a computer system, the instructions when executed by the one or more computer processors cause the one or more computer processors to:
generate an input layer of a machine learning module of the computer system, the input layer comprising a graphical representation of a plurality of datasets obtained from one or more hydrocarbon wells, the graphical representation defining a plurality of bins;
generate an encoding layer of the machine learning module from the graphical representation, the encoding layer comprising a two-dimensional (2D) array based on the plurality of datasets and a merged dataset of the one or more hydrocarbon wells;
determine that a difference between a first hydrocarbon well log of the plurality of datasets and a second hydrocarbon well log of the merged dataset warrants an action, wherein the determining is performed using a convolutional layer of the machine learning module;
responsive to determining that the difference warrants an action, perform the action on the first hydrocarbon well log and the second hydrocarbon well log to modify the merged dataset; and
produce the merged dataset for generating a subsurface model of the one or more hydrocarbon wells.

9. The non-transitory computer-readable storage medium of claim 8, wherein the plurality of datasets and the merged dataset are wireline datasets, and wherein the 2D array defines a horizontal number of bins and a vertical number of bins of the plurality of bins.

10. The non-transitory computer-readable storage medium of claim 8, wherein the performing of the action comprises at least one of:
splicing the first hydrocarbon well log and the second hydrocarbon well log into the merged dataset based on the difference; or
replacing the second hydrocarbon well log with the first hydrocarbon well log based on the difference.

11. The non-transitory computer-readable storage medium of claim 8, wherein the generating of the encoding layer comprises assigning a particular value to each bin of the plurality of bins responsive to at least one of the first hydrocarbon well log or the second hydrocarbon well log intersecting the bin.

12. The non-transitory computer-readable storage medium of claim 8, wherein the instructions further cause the one or more computer processors to filter the 2D array using the convolutional layer of the machine learning module.

13. The non-transitory computer-readable storage medium of claim 8, wherein the instructions further cause the one or more computer processors to:
train the machine learning module to determine differences between stored hydrocarbon well logs; and
determine filter coefficients of the convolutional layer of the machine learning module based on the training.

14. The non-transitory computer-readable storage medium of claim 13, wherein the instructions further cause the one or more computer processors to process the 2D array using a modified rectified linear unit (RelU) layer of the machine learning module.

15. A computer system comprising:
one or more computer processors; and
a non-transitory computer-readable storage medium storing instructions executable by the one or more computer processors, the instructions when executed by the one or more computer processors cause the one or more computer processors to:
generate an input layer of a machine learning module of the computer system, the input layer comprising a graphical representation of a plurality of datasets obtained from one or more hydrocarbon wells, the graphical representation defining a plurality of bins;
generate an encoding layer of the machine learning module from the graphical representation, the encoding layer comprising a two-dimensional (2D) array based on the plurality of datasets and a merged dataset of the one or more hydrocarbon wells;
determine that a difference between a first hydrocarbon well log of the plurality of datasets and a second hydrocarbon well log of the merged dataset warrants an action, wherein the determining is performed using a convolutional layer of the machine learning module;
responsive to determining that the difference warrants an action, perform the action on the first hydrocarbon well log and the second hydrocarbon well log to modify the merged dataset; and
produce the merged dataset for generating a subsurface model of the one or more hydrocarbon wells.

16. The computer system of claim 15, wherein the plurality of datasets and the merged dataset are wireline datasets, and wherein the 2D array defines a horizontal number of bins and a vertical number of bins of the plurality of bins.

17. The computer system of claim 15, wherein the performing of the action comprises at least one of:
splicing the first hydrocarbon well log and the second hydrocarbon well log into the merged dataset based on the difference; or
replacing the second hydrocarbon well log with the first hydrocarbon well log based on the difference.

18. The computer system of claim 15, wherein the generating of the encoding layer comprises assigning a particular value to each bin of the plurality of bins responsive to at least one of the first hydrocarbon well log or the second hydrocarbon well log intersecting the bin.

19. The computer system of claim 15, wherein the instructions further cause the one or more computer processors to filter the 2D array using the convolutional layer of the machine learning module.

20. The computer system of claim 15, wherein the instructions further cause the one or more computer processors to:
train the machine learning module to determine differences between stored hydrocarbon well logs; and
determine filter coefficients of the convolutional layer of the machine learning module based on the training.

* * * * *